United States Patent
Malek-Mohammadi et al.

(10) Patent No.: US 11,616,542 B2
(45) Date of Patent: Mar. 28, 2023

(54) CHANNEL-MATRIX REDUCTION FOR PRECODING CONTROL

(71) Applicant: Telefonaktiebolaget LM Ericsson (publ), Stockholm (SE)

(72) Inventors: Mohammadreza Malek-Mohammadi, Solna (SE); Niklas Jaldén, Enköping (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 16 days.

(21) Appl. No.: 17/600,853

(22) PCT Filed: Apr. 5, 2019

(86) PCT No.: PCT/EP2019/058633
§ 371 (c)(1),
(2) Date: Oct. 1, 2021

(87) PCT Pub. No.: WO2020/200471
PCT Pub. Date: Oct. 8, 2020

(65) Prior Publication Data
US 2022/0158694 A1    May 19, 2022

(51) Int. Cl.
*H04B 7/04* (2017.01)
*H04B 7/0456* (2017.01)

(52) U.S. Cl.
CPC ............... *H04B 7/046* (2013.01)

(58) Field of Classification Search
CPC ............................................. H04B 7/046
See application file for complete search history.

(56) References Cited

U.S. PATENT DOCUMENTS

| 2015/0215014 A1 | 7/2015 | Zhu et al. |
| 2018/0048363 A1 | 2/2018 | Okuyama et al. |

OTHER PUBLICATIONS

Drvenica, Bojan, et al., "Compression analysis of massive MIMO uplink", Master's thesis in Communication Engineering, Department of Signals and Systems, Chalmers University of Technology, Gothenburg, Sweden, 2016, 1-66.

*Primary Examiner* — Curtis B Odom
(74) *Attorney, Agent, or Firm* — Murphy, Bilak & Homiller, PLLC (57) ABSTRACT

A channel matrix representing characteristics of a multi-path channel between a transmitter device (210) equipped with multiple transmitter antennas (211, 212, 213, 214, 215) and a receiver device (220, 230, 240) equipped with multiple receiver antennas (221, 222, 231, 232, 241, 242) is determined. The channel matrix is organized in a first number of channel vectors each associated with a different one of the multiple receiver antennas (221, 222, 231, 232, 241, 242). The channel vectors are combined to a smaller second number of linear combinations of the channel vectors and a reduced channel matrix is composed from the linear combinations of the channel vectors. A precoding matrix is determined based on the reduced channel matrix, and multi-antenna transmission by the transmitter device is controlled based on the determined precoding matrix.

20 Claims, 6 Drawing Sheets

FIG. 7

CHANNEL-MATRIX REDUCTION FOR PRECODING CONTROL

TECHNICAL FIELD

The present invention relates to methods for controlling multi-antenna transmission and to corresponding devices, systems, and computer programs.

BACKGROUND

In wireless communication, it is known to utilize multi-antenna transmission for enhancing performance, e.g., in terms of throughput and/or capacity. For example, in a wireless communication network based on the LTE (Long Term Evolution) or the NR (New Radio) technology specified by 3GPP ($3^{rd}$ Generation Partnership Project), multi-user MIMO (MU-MIMO) communication may be used for serving several users simultaneously with the same time and frequency resource. In this case, an access node of the wireless communication network, in the LTE technology referred to as "eNB" and in the NR technology referred to as "gNB", and/or the user terminals, referred to as UEs (UE: user equipment), are equipped with multiple antennas. The multiple antennas enable spatial diversity for transmission of data in both an uplink (UL) direction from the UEs to the network and a downlink (DL) direction from the network to the UEs. The spatial diversity significantly increases the capacity of the network. Accordingly, the MU-MIMO technology may allow for a more efficient utilization of the available frequency spectrum. Moreover, the MU-MIMO technology can reduce inter-cell interference which in turn may allow for more frequency re-use. As the electromagnetic spectrum is a rare resource, the MU-MIMO technology may constitute a valuable contribution when aiming at extension of the capacity of the wireless communication network.

One important aspect for an effective deployment of the MU-MIMO technology is the availability of an accurate estimate of channel responses between the access node and the UEs in the associated network cell. These channel responses may relate to both DL transmissions and UL transmissions and help to form the beams from the access node toward the targeted UEs and vice versa. The channel from a UE to the access node is typically referred to as UL channel, while the channel from the access node to the UE is typically termed DL channel. In some scenarios, the UL channel may be estimated based on pilot signals sent from the UEs to the access node, assuming reciprocity of the UL channel and the DL channel. These pilot signals are also referred to as "sounding". In the LTE and NR technology the pilot signals are referred to as Sounding Reference Signals (SRS).

Algorithms used for controlling MU-MIMO transmission are typically based on calculating a precoding matrix on the basis of channel estimates, in particular on the basis of a channel matrix representing the channel estimates in terms of channel coefficients for multiple receiver antennas and multiple transmitter antennas. In some scenarios, when the number of allocated layers (streams) for a certain UE is less than the number of receiver antennas of the UE, the dimensionality of the channel matrix used for calculation of the precoding matrix may need to be reduced. This is typically accomplished by selecting the strongest available channels. However, this way of reducing the dimensionality may result in deficient performance of the precoding matrix.

Accordingly, there is a need for techniques which allow for efficiently reducing dimensionality of a channel matrix when determining a precoding matrix for multi-antenna transmission.

SUMMARY

According to an embodiment, a method of controlling multi-antenna transmission is provided. The method comprises determining a channel matrix. The channel matrix represents characteristics of a multi-path channel between a transmitter device equipped with multiple transmitter antennas and at least one receiver device equipped with multiple receiver antennas. The channel matrix is organized in a first number of channel vectors each associated with a different one of the multiple receiver antennas. Further, the method comprises combining the channel vectors to a smaller second number of linear combinations of the channel vectors and composing a reduced channel matrix from the linear combinations of the channel vectors. Further, the method comprises determining a precoding matrix based on the reduced channel matrix. Further, the method comprises controlling multi-antenna transmission by the transmitter device based on the determined precoding matrix.

According to a further embodiment, a device for controlling multi-antenna transmission is provided. The device is configured to determine a channel matrix. The channel matrix represents characteristics of a multi-path channel between a transmitter device equipped with multiple transmitter antennas and at least one receiver device equipped with multiple receiver antennas. The channel matrix is organized in a first number of channel vectors each associated with a different one of the multiple receiver antennas. Further, the device is configured to combine the channel vectors to a smaller second number of linear combinations of the channel vectors and compose a reduced channel matrix from the linear combinations of the channel vectors. Further, the device is configured to determine a precoding matrix based on the reduced channel matrix. Further, the device is configured to control multi-antenna transmission by the transmitter device based on the determined precoding matrix.

According to a further embodiment, a device for controlling multi-antenna transmission is provided. The device comprises at least one processor and a memory. The memory contains instructions executable by said at least one processor, whereby the device is operative to determine a channel matrix. The channel matrix represents characteristics of a multi-path channel between a transmitter device equipped with multiple transmitter antennas and at least one receiver device equipped with multiple receiver antennas. The channel matrix is organized in a first number of channel vectors each associated with a different one of the multiple receiver antennas. Further, the memory contains instructions executable by said at least one processor, whereby the device is operative to combine the channel vectors to a smaller second number of linear combinations of the channel vectors and compose a reduced channel matrix from the linear combinations of the channel vectors. Further, the memory contains instructions executable by said at least one processor, whereby the device is operative to determine a precoding matrix based on the reduced channel matrix. Further, the memory contains instructions executable by said at least one processor, whereby the device is operative to control multi-antenna transmission by the transmitter device based on the determined precoding matrix.

According to a further embodiment of the invention, a computer program or computer program product is provided, e.g., in the form of a non-transitory storage medium, which comprises program code to be executed by at least one processor of a device for controlling multi-antenna transmission. Execution of the program code causes the device to determine a channel matrix. The channel matrix represents characteristics of a multi-path channel between a transmitter device equipped with multiple transmitter antennas and at least one receiver device equipped with multiple receiver antennas. The channel matrix is organized in multiple channel vectors each associated with a different one of the multiple receiver antennas. Further, execution of the program code causes the device to combine the channel vectors to a smaller second number of linear combinations of the channel vectors and compose a reduced channel matrix from the linear combinations of the channel vectors. Further, execution of the program code causes the device to determine a precoding matrix based on the reduced channel matrix. Further, execution of the program code causes the device to control multi-antenna transmission by the transmitter device based on the determined precoding matrix.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of multi-antenna transmission in a wireless communication network. The wireless communication network may be based on the LTE radio technology or the NR radio technology and in particular involve DL MU-MIMO transmission from an access node of the wireless communication network, e.g., an eNB or a gNB, to multiple UEs. However, it is noted that the illustrated concepts could also be applied to other radio technologies and/or or other communication scenarios, e.g., beamformed transmission in the UL direction and/or usage of a WLAN (Wireless Local Area Network) technology.

In the illustrated examples, the multi-antenna transmission involves applying a precoding matrix to control beamforming characteristics of transmissions from a transmitter device to a receiver device. The precoding matrix is calculated from a channel matrix with reduced dimensionality, e.g., because a number of spatial streams required for a receiving device is less than the number of receiver antennas available at the receiver device. In view of this situation, the dimensionality of a full channel matrix, considering all transmitter antennas of the transmitter device and all receiver antennas of the receiver device, is reduced by constructing a reduced channel matrix from linear combinations of channel vectors forming the full channel matrix. The weight factors for the linear combination of the channel vectors can be obtained by calculating the Gram matrix of the channel vectors. In some scenarios, the Gram matrix may also be calculated by averaging over a set of frequencies, e.g., subcarriers. The weight factors for the linear combination of the channel vector can then be determined from eigenvectors and eigenvalues of the Gram matrix.

Figure 1:
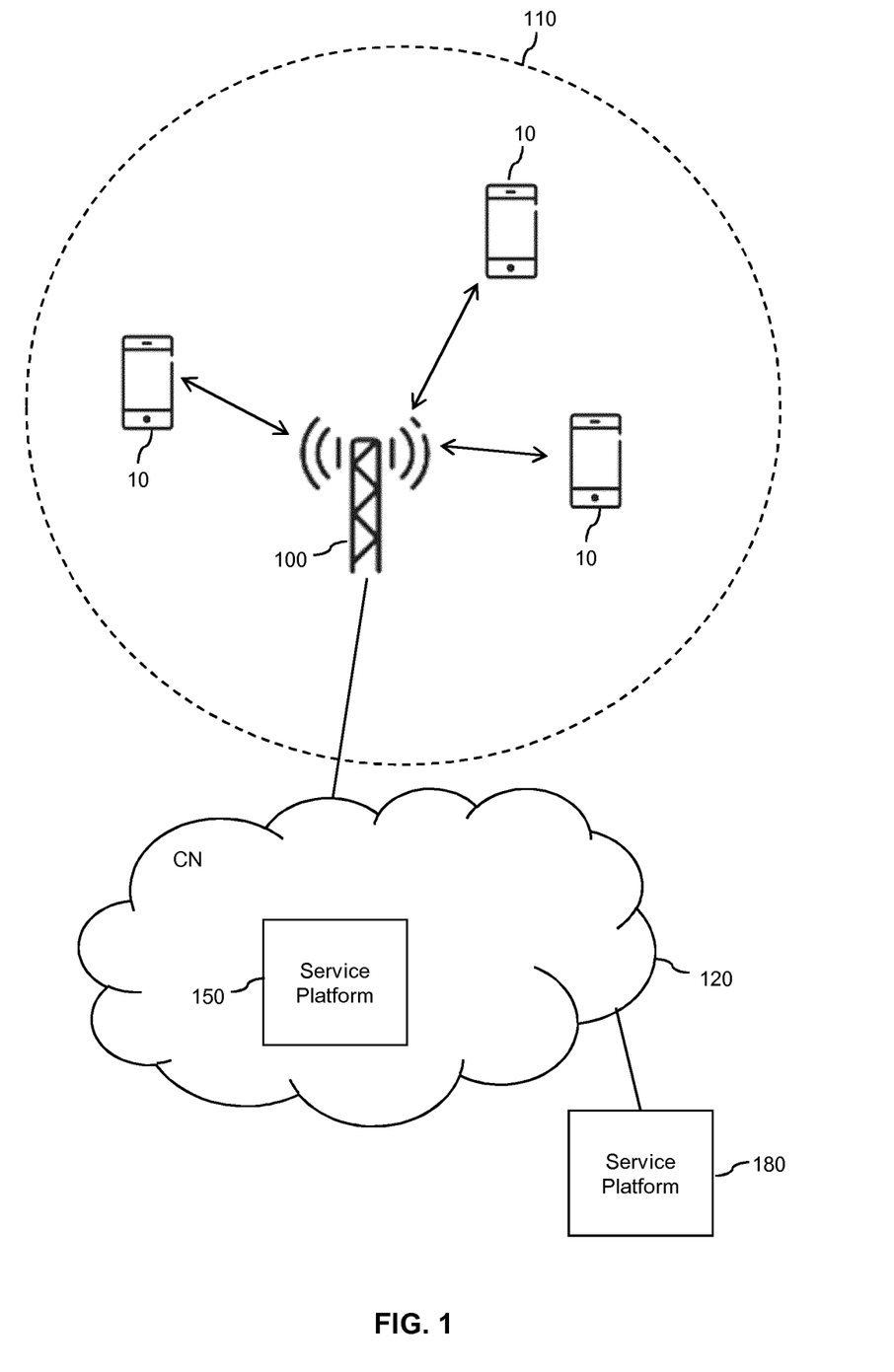
FIG. 1 schematically illustrates an exemplary wireless communication system in which multi-antenna transmission is controlled according to an embodiment of the invention.

FIG. 1 illustrates exemplary wireless communication network structures. In particular, FIG. 1 shows multiple UEs 10 in a cell 110 of the wireless communication network. The cell 110 is assumed to be served by an access node 100, e.g., an eNB of the LTE technology or a gNB of the NR technology. Further, FIG. 1 illustrates a core network (CN) 120 of the wireless communication network. As illustrated by double-headed arrows, the access node 100 may send DL transmissions to the UEs, and the UEs may send UL transmissions to the access node 100. The DL transmissions and UL transmissions may be used to provide various kinds of services to the UEs, e.g., a voice service, a multimedia service, or a data service. Such services may be hosted in the wireless communication network. By way of example, FIG. 1 illustrates a service platform 150 provided in the core network 120. The service platform 150 may for example be based on a server or a cloud computing system. Further, FIG. 1 illustrates a service platform 180 provided outside the wireless communication network. The service platform 180 could for example connect through the Internet or some other wide area communication network to the wireless communication network. Also the service platform 180 may be based on a server or a cloud computing system. The service platform 150 and/or the service platform 180 may provide one or more services to the UEs 10, using data conveyed by DL transmissions and/or UL transmissions between the access node 100 and the respective UE 10.

Figure 2:
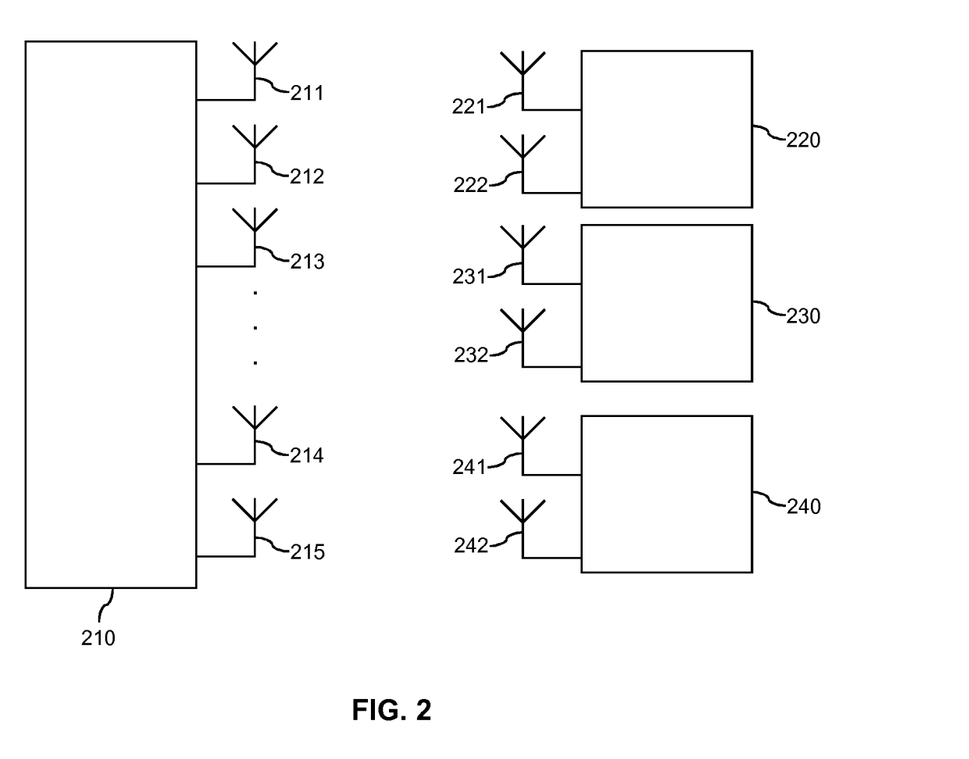
FIG. 2 schematically illustrates a MU-MIMO communication scenario according to an embodiment of the invention.

FIG. 2 schematically illustrates multi-antenna transmission between a transmitter device 210 and multiple receiver devices 220, 230, 240. Assuming DL transmissions in a wireless communication network like illustrated in FIG. 1, the transmitter device 210 may correspond to the access node 100, and the receiver devices 220, 230, 240 may correspond to the UEs 10. As illustrated in FIG. 1, the transmitter device 210 is equipped with a plurality of transmitter antennas 211, 212, 213, 214, 215. In the following explanations, the number of the transmitter antennas 211, 212, 213, 214, 215 is denoted by n. As further illustrated, each of the receiver devices 220, 230, 240 is equipped with multiple receiver antennas. Specifically, the receiver device 220 is equipped with receiver antennas 221, 222, the receiver device 230 is equipped with receiver antennas 231, 232, and the receiver device 240 is equipped with receiver antennas 241, 242. In the following explanations, p denotes the number of the considered receiver devices 220, 230, 240. For simplicity, it is assumed that the number of receiver antennas 221, 222, 231, 232, 241, 242 is the same for each of the receiver devices 220, 230, 240. The number of receiver antennas 221, 222, 231, 232, 241, 242 per receiver device 220, 230, 240 is denoted with m.

With the above assumptions, the channel matrix $H^{DL}[(\wp m) \times n]$ estimated for the DL transmission direction at a certain subcarrier denoted by sc can be written as follows:

$$H_{sc}^{DL}[(pm) \times n] = \begin{bmatrix} h_{1,1} & \cdots & h_{1,n} \\ \vdots & \vdots & \vdots \\ h_{m,1} & \cdots & h_{m,n} \\ h_{(m+1),1} & \cdots & h_{(m+1),n} \\ \vdots & \cdots & \vdots \\ h_{(2m),1} & \cdots & h_{(2m),n} \\ \vdots & \vdots & \vdots \\ h_{((p-1)m+1),1} & \cdots & h_{((p-1)m+1),n} \\ \vdots & \vdots & \vdots \\ h_{(pm),1} & \cdots & h_{(pm),n} \end{bmatrix} \quad (1)$$

The channel matrix $HD_{sc}^{DL}$ may be individually estimated for multiple subcarriers, e.g., all subcarriers of the frequency bandwidth utilized in the transmission.

As can be seen, the channel matrix may be regarded as being composed of channel vectors (in the illustrated example corresponding to the rows of the channel matrix $H_{sc}^{DL}$). Each channel vector corresponds to a specific one of the multiple receiver antennas 221, 222, 231, 232, 241, 242 and has multiple vector components, each corresponding to a different one of the transmitter antennas 211, 212, 213, 214, 215.

For the sake of simplicity, in the following only a single receiver device 220, 230, 240 will be considered. In this case, the channel matrix can be simplified to:

$$H_{sc}^{DL}[m \times n] = \begin{bmatrix} h_{1,1} & \cdots & h_{1,n} \\ \vdots & \ddots & \vdots \\ h_{m,1} & \cdots & h_{m,n} \end{bmatrix}. \quad (2)$$

The general closed-form formula for calculation of the precoding matrix for minimum mean square error (MMSE) based precoding algorithms can then be written as:

$$W_{sc} = \left(H_{sc}^{DL^H} H_{sc}^{DL} + \lambda R\right)^{-1} H_{sc}^{DL^H}, \quad (3)$$

where $\lambda$ is a regularization parameter, R is a matrix that depends on the particular type of the utilized MMSE based precoding algorithm, and sc denotes the index of the subcarrier the precoding matrix is calculated for. For example, R can include interference and/or channel estimation error covariance matrices. When assuming $\lambda=0$, relation (3) simplifies to the closed-form formula for a zero-forcing (ZF) based algorithm. The precoding matrix $W_{sc}$ may be individually estimated for multiple subcarriers, e.g., all subcarriers of the frequency bandwidth utilized in the transmission.

In some situations, e.g., in the case of limited available resources, poor SNR (signal-to-noise-ratio), or in view of optimizing throughput, it may happen that a scheduling algorithm decides to allocate a reduced number of spatial layers to the transmissions from the transmitter device 210 to the receiver device 220, 230, 240. This reduced number is smaller than a maximum number of spatial layers which would be possible in view of the number of receiver antennas 221, 222, 231, 232, 241, 242 of the receiver device 220, 230, 240, i.e., smaller than the number of receiver antennas 221, 222, 231, 232, 241, 242 of the receiver device 220, 230, 240. In this situation, the dimensionality of the estimated channel matrix $H_{sc}^{DL}$ is reduced, and calculation of the precoding matrix $W_{sc}$ is performed on the basis of the reduced channel matrix $H_{sc_r}^{DL}$. For example, if the number of the receiver antennas 221, 222, 231, 232, 241, 242 is two, i.e., m=2, and the transmission uses only one spatial layer, i.e., the number of spatial layers is $m_r=1$, then calculation of the precoding matrix $W_{sc}$ is performed on the basis of a reduced channel matrix $H_{sc_r}^{DL}$ with dimensionality of 1×n. The reduced channel matrix $H_{sc_r}^{DL}$ is constructed from one or more linear combination of the channel vectors of the estimated channel matrix $H_{sc}^{DL}$. Further details of how the reduced channel matrix $H_{sc_r}^{DL}$ may be calculated from the estimated channel matrix le will be described in the following.

In the following explanations, $G = H_{sc}^{DL} H_{sc}^{DL^H}$, where $H_{sc}^{DL^H}$ represents the Hermitian transpose of $H_{sc}^{DL}$, denotes the Gram matrix of the rows of $H_{sc}^{DL}$ with size of m×m. The Gram matrix G captures all possible inner products between different rows of $H_{sc}^{DL}$.

In order to determine the reduced channel matrix $H_{sc_r}^{DL}$, the Gram matrix $G = H_{sc}^{DL} H_{sc}^{DL^H}$ is calculated. Then eigenvectors of the Gram matrix G are determined. The eigenvectors have a dimensionality of m×1. A subset of $m_r$ eigenvectors is selected and used to construct a transformation matrix T with dimensionality m×$m_r$. The selection may be based on the eigenvalues associated with the eigenvectors. In particular, the eigenvectors having the largest associated eigenvalues may be selected. By applying the transformation matrix T to the channel matrix $H_{sc}^{DL}$ the reduced channel matrix can be calculated according to:

$$H_{sc_r}^{DL} = T^T H_{sc}^{DL}, \quad (4)$$

where $T^T$ denotes the transpose of matrix T.

As can be seen, the matrix transformation of (4) may be regarded as calculating one or more linear combination of the rows of $H_{sc}^{DL}$, i.e., calculating linear combinations of the channel vectors, and assembling the linear combinations to form the reduced channel matrix $H_{sc_r}^{DL}$. In the linear combinations, weight factors of the channel vectors are determined by the eigenvectors and eigenvalues of the Gram matrix G. In this way, the reduced channel matrix can efficiently take into account not only strengths of the channels corresponding to the different receiver antennas 221, 222, 231, 232, 241, 242, but also their similarities, which are captured by the inner products in the Gram matrix G.

According to a variant, the Gram matrix G may also be calculated by averaging of channel matrices estimated for different subcarriers. This may be accomplished according to:

$$G = \frac{1}{N} \sum_{sc} H_{sc}^{DL} H_{sc}^{DL^H}, \quad (5)$$

where N denotes the number of subcarriers used in the averaging. The subcarriers used in the averaging may be neighboring subcarriers of the particular subcarrier for which the precoding matrix is calculated. By calculating the Gram matrix G by averaging over multiple subcarriers, it can be taken into account this fact that there is some noise in the estimated channel matrix $H_{sc}^{DL}$, and the impact of this noise on the weight factors of the linear combinations.

Figure 3:
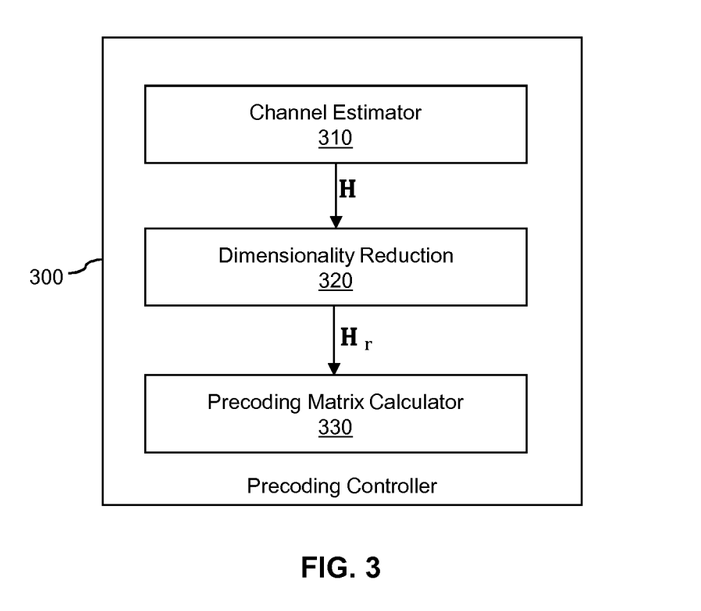
FIG. 3 schematically illustrates a precoding controller according to an embodiment of the invention.

FIG. 3 schematically illustrates a precoding controller 300 which may be used to implement the illustrated concepts. The precoding controller 300 could be implemented by the transmitter device 210 and provide the precoding matrices utilized by the transmitter device 210 when performing the multi-antenna transmissions. However, it is noted that at least a part of the precoding controller 300 could also be implemented separately from the transmitter device 210, e.g., by a standalone node and/or by one or more of the receiver devices 220, 230, 240.

As illustrated, the precoding controller 300 includes a channel estimator 310. The channel estimator 310 may be configured to provide the above-mentioned estimate(s) of the channel matrix. For example, the channel estimator could apply channel reciprocity and estimate the channel matrix from signals, e.g., sounding or reference signals, transmitted from the receiver devices 220, 230, 240 to the transmitter device 210. This option may be particular useful when using a TDD mode of the transmissions between the transmitter device 210 and the receiver devices 220, 230, 240. Alternatively or in addition, the channel estimator 320 could estimate the channel matrix from signals, e.g., sounding or reference signals, transmitted from the transmitter device 210 to the receiver devices 220, 230, 240. The estimation process could then further involve reporting of measurements from the receiver devices 220, 230, 240 to the transmitter device 210.

As further illustrated, the precoding controller 300 includes a dimensionality reduction stage 320. The dimensionality reduction stage is configured to calculate a reduced channel matrix, i.e., a channel matrix with reduced dimensionality, from the channel matrix provided by the channel estimator 310. This may be accomplished as explained above, e.g., using relation (4) and optionally relation (5).

As further illustrated, the precoding controller 300 includes a precoding matrix calculator 330. The precoding matrix calculator 330 is configured to calculate the precoding matrix from the reduced channel matrix provided by the dimensionality reduction stage 320, e.g. using an MMSE based precoding algorithm, a ZF based precoding algorithm, or some other precoding algorithm.

Figure 4:
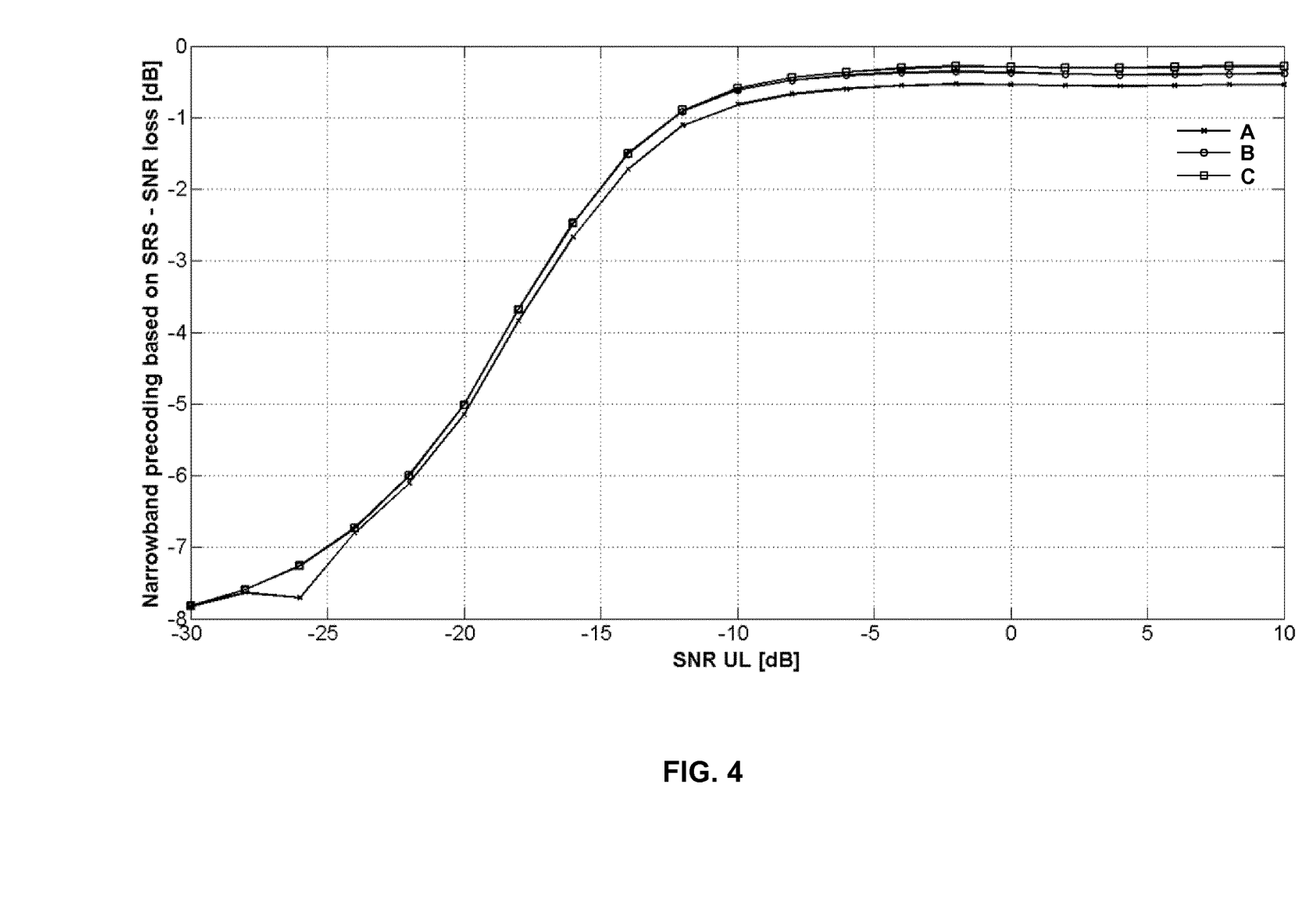
FIG. 4 shows exemplary simulation results for illustrating performance of precoding matrix calculation according to an embodiment of the invention.

FIG. 4 shows results of numerical simulations which demonstrate effectiveness and performance of precoding matrices calculated on the basis of a reduced channel matrix determined in accordance with the illustrated concepts. The simulations assume utilization of the NR technology for DL transmissions from the gNB to the UE, with eight antennas at the gNB and two antennas at the UE, with only one spatial layer being allocated to the DL transmissions. In the simulations, the precoding matrices are calculated on the basis of an MMSE based algorithm. In FIG. 4, a metric referred to as precoding SNR loss, as a function of uplink SNR, is used to compare the performance of the precoding matrices from the illustrated concepts to precoding matrices obtained by reducing the dimensionality of the channel matrix in a conventional manner by selecting the of the channel matrix which has the highest $\ell_2$ norm, i.e., the highest Euclidian norm. The precoding SNR loss denotes the loss that a practical precoder would have as compared to a precoder that knows the true channel. Specifically, a first plot denoted by "A" illustrates the performance of the conventionally obtained precoding matrices, a second plot denoted by "B" illustrates the performance of the precoding matrices obtained by reducing the dimensionality channel matrix according to (4) without averaging of the Gram matrix over subcarriers, and a third plot denoted by "C" illustrates the performance of the precoding matrices obtained by reducing the dimensionality channel matrix according to (4) with averaging of the Gram matrix over subcarriers according to (5). In the illustrated example, the averaging was performed over 4 PRBs (Physical Resource Blocks), with 12 subcarriers each. As can be seen, the precoding matrices obtained according to the illustrated concepts (plots B and C) offer a better performance than those obtained on the basis of the conventional dimensionality reduction (plot A). Further, it can be seen that the averaging of the Gram matrix allows for even further improving the performance.

Figure 5:
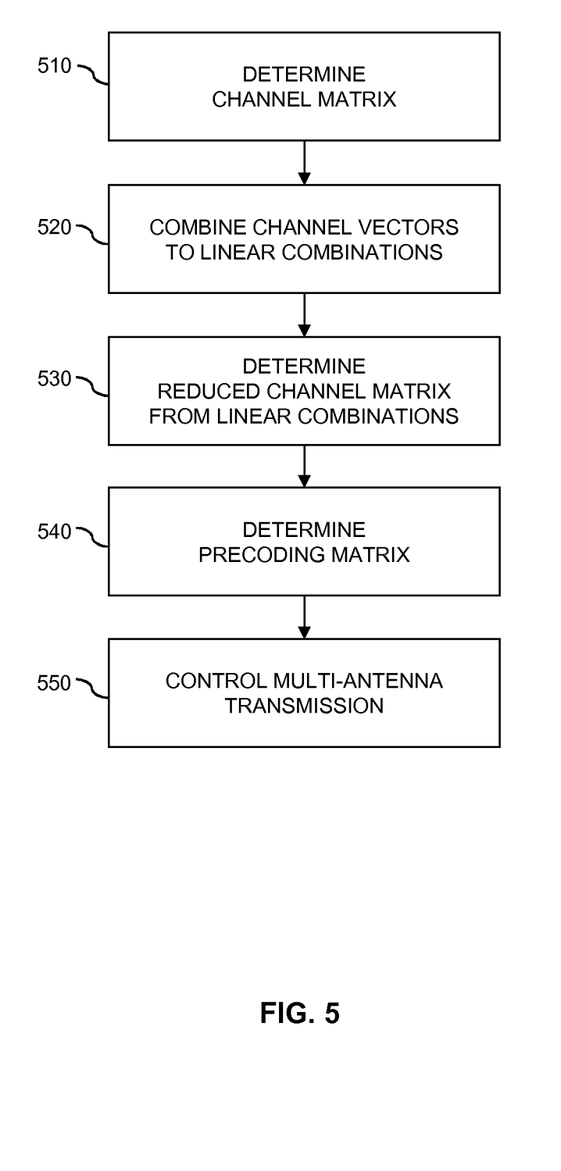
FIG. 5 shows a flowchart for illustrating a method according to an embodiment of the invention.

FIG. 5 shows a flowchart for illustrating a method of controlling multi-antenna transmission, which may be utilized for implementing the illustrated concepts. The method of FIG. 5 may be used for implementing the illustrated concepts in a device for controlling multi-antenna transmission, e.g., corresponding to any of the above-mentioned entities 10, 100, 210, 220, 230, 240, or 300.

If a processor-based implementation of the device is used, at least some of the steps of the method of FIG. 5 may be performed and/or controlled by one or more processors of the device. Such device may also include a memory storing program code for implementing at least some of the below described functionalities or steps of the method of FIG. 5.

At step 510, a channel matrix is determined. The channel matrix represents characteristics of a multi-path channel between a transmitter device, such as the above-mentioned access node 100 or the above-mentioned transmitter device 210, and a receiver device, such as one of the above-mentioned UEs 10 or receiver devices 220, 230, 240. Accordingly, the transmitter device may be an access node of a wireless communication network and the receiver device may be a wireless communication device, in particular a UE, connected to the wireless communication network.

The transmitter device is equipped with multiple transmitter antennas, such as the above-mentioned transmitter antennas 211, 212, 213, 214, 215. The at least one receiver device is equipped with multiple receiver antennas, such as the above-mentioned antennas 221, 222, 231, 232, 241, 242. The channel matrix is organized in a first number of channel vectors each associated with a different one of the multiple receiver antennas. As explained in the above example, the channel vectors may correspond to rows of the channel matrix. However, depending on the way of defining the channel matrix, the channel vectors could also correspond to columns of the channel matrix.

The channel matrix may be determined based on measurements on signals transmitted from the receiver device to the transmitter device, e.g., based on assuming channel reciprocity. Alternatively or in addition, the channel matrix may be determined based on measurements on signals transmitted from the transmitter device to the receiver device. The latter option may additionally involve reporting of measurements from the receiver device to the transmitter device. In some scenarios, the channel matrix may be determined for each of multiple different frequencies, e.g., multiple subcarriers of an OFDM (Orthogonal Frequency Division Multiplexing) scheme, such as used in the NR or LTE technology.

At step 520, the channel vectors of the channel matrix are combined to a smaller second number of linear combinations of the channel vectors. The smaller second number may for example correspond to a number of spatial layers of the multi-antenna transmission. In some scenarios the smaller second number could also be one, i.e., the channel vectors may then be combined to one linear combination of the channel vectors. At step 530, a reduced channel matrix is composed from the linear combinations of the channel vectors. Here, it is noted that steps 520 and 530 may also be combined in a matrix transformation of the channel matrix, e.g., as further described below.

In some scenarios, steps 520 and 530 may involve determining a Gram matrix of the channel matrix, determining eigenvectors and associated eigenvalues of the Gram matrix, selecting the eigenvectors associated with the largest eigenvalues, and transforming the channel matrix based on the selected eigenvectors. This transforming of the channel matrix can in particular involve composing a transformation matrix from the selected eigenvectors and applying the transformation matrix to the channel matrix, transforming the channel matrix to the reduced channel matrix. The number of the selected eigenvectors may correspond to the second number. In some scenarios, the eigenvectors may be sorted according to the associated eigenvalues and the transformation matrix then composed from the sorted eigenvectors. The reduced channel matrix may for example be calculated according to relation (5).

In some scenarios, if the channel matrix is determined for each of multiple different frequencies, e.g., subcarriers of an OFDM (Orthogonal Frequency Division Multiplexing) scheme, such as used in the NR or LTE technology, the Gram matrix may be determined by averaging over states of the channel matrix as determined for each of the multiple different frequencies. For example, such averaging could be performed according to relation (5).

At step 540, a precoding matrix is determined based on the reduced channel matrix. For example, the precoding matrix may be determined based on an MMSE based algorithm or on based on a ZF based algorithm, e.g., using relation (3).

At step 550, multi-antenna transmission by the transmitter device is controlled based on the determined precoding matrix. This may involve providing the precoding matrix to the transmitter device or using the precoding matrix to generate other control signals for controlling multi-antenna transmission by the transmitter device. The multi-antenna transmission may be based on modulation of symbols onto multiple subcarriers, e.g., multiple subcarriers of an OFDM (Orthogonal Frequency Division Multiplexing) scheme, such as used in the NR or LTE technology, and the multiple frequencies comprise at least some of the subcarriers.

Figure 6:
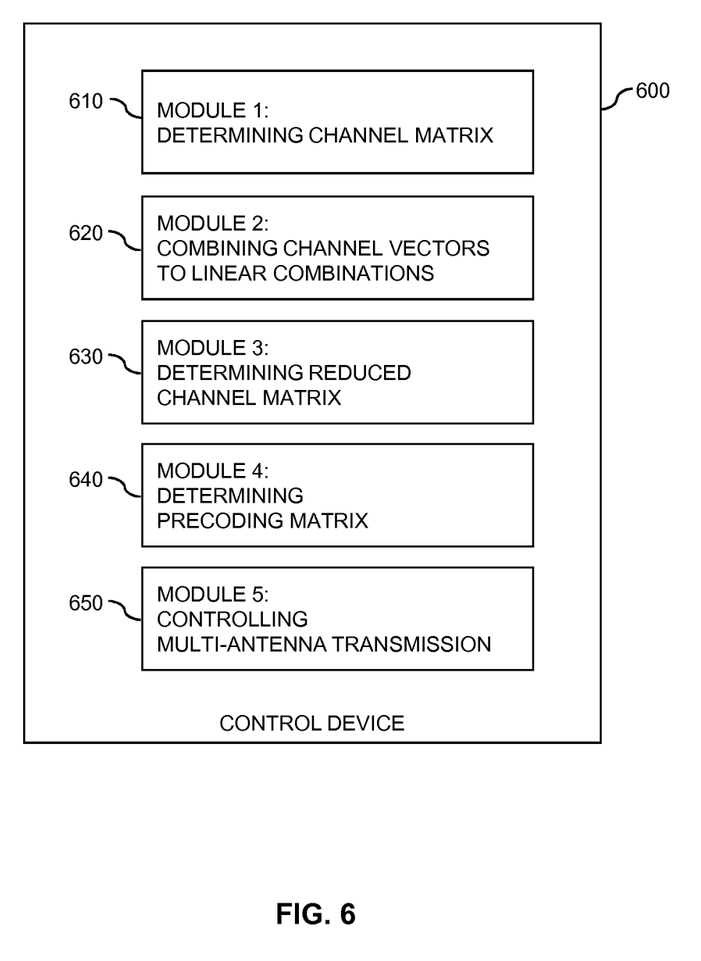
FIG. 6 shows an exemplary block diagram for illustrating functionalities of a device implementing functionalities corresponding to the method of FIG. 5.

FIG. 6 shows a block diagram for illustrating functionalities of a device 600 which operates according to the method of FIG. 5. The device 600 may for example correspond to be part of any of the above-mentioned entities 10, 100, 210, 220, 230, 240, or 300. As illustrated, the device 600 may be provided with a module 610 configured to determine a channel matrix, such as explained in connection with step 510. Further, the device 600 may be provided with a module 620 configured to combine channel vectors to linear combinations, such as explained in connection with step 520. Further, the device 600 may be provided with a module 630 configured to compose a reduced channel matrix from the linear combinations, such as explained in connection with step 530. Further, the device 600 may be provided with a module 640 configured to determine a precoding matrix from the reduced channel matrix, such as explained in connection with step 650. Further, the device 600 may be provided with a module 650 configured to control multi-antenna transmission, such as explained in connection with step 650.

It is noted that the device 600 may include further modules for implementing other functionalities, such as known functionalities of an access node or other type of transmitter device or receiver device. Further, it is noted that the modules of the device 600 do not necessarily represent a hardware structure of the device 600, but may also correspond to functional elements, e.g., implemented by hardware, software, or a combination thereof.

Figure 7:
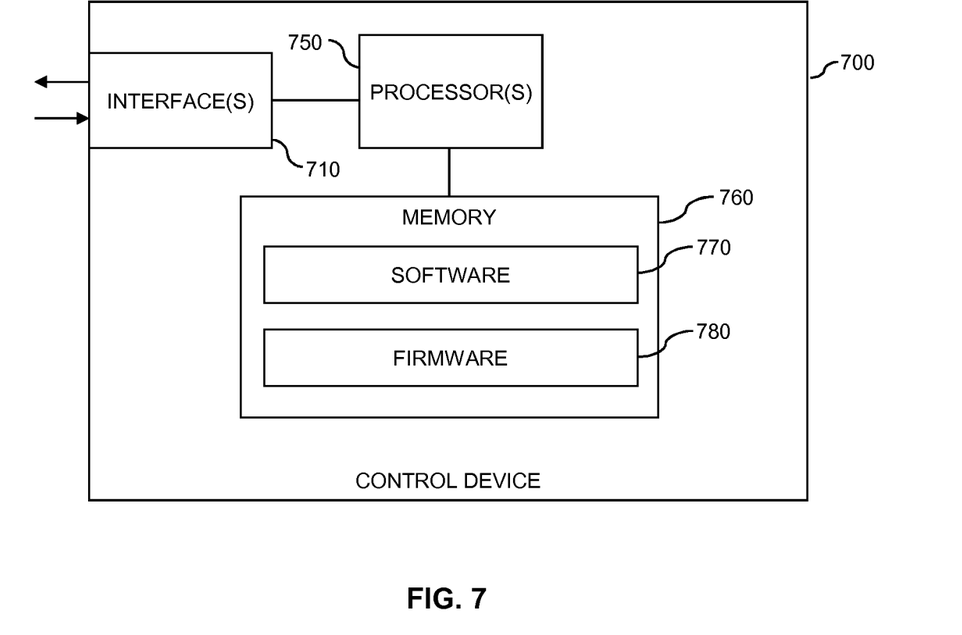
FIG. 7 schematically illustrates structures of a device according to an embodiment of the invention.

FIG. 7 illustrates a processor-based implementation of a device 700 which may be used for implementing the above-described concepts. For example, the structures as illustrated in FIG. 7 may be used for implementing the concepts in any of the above-mentioned entities 10, 100, 210, 220, 230, 240, or 300.

As illustrated, the device 700 includes one or more interfaces 710. In some scenarios, the interfaces 710 may include a radio interface for performing the multi-antenna transmissions. Such radio interface could be based on the LTE technology or the NR technology.

Further, the device 700 may include one or more processors 750 coupled to the interface(s) 710 and a memory 760 coupled to the processor(s) 750. By way of example, the interface(s) 810, the processor(s) 750, and the memory 760 could be coupled by one or more internal bus systems of the device 700. The memory 760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 760 may include software 770 and/or firmware 780. The memory 760 may include suitably configured program code to be executed by the processor(s) 750 so as to implement the above-described functionalities of a device for controlling multi-antenna transmission, such as explained in connection with FIGS. 5 and 6.

It is to be understood that the structures as illustrated in FIG. 7 are merely schematic and that the device 700 may actually include further components which, for the sake of clarity, have not been illustrated, e.g., further interfaces or processors. Also, it is to be understood that the memory 760 may include further program code for implementing known functionalities of a transmitter device or receiver device, e.g., known functionalities of an access node or of a UE. According to some embodiments, also a computer program may be provided for implementing functionalities of the device 700, e.g., in the form of a physical medium storing the program code and/or other data to be stored in the memory 760 or by making the program code available for download or by streaming.

As can be seen, the concepts as described above may be used for efficiently controlling multi-antenna transmission. Specifically, the concepts may allow for determining precoding matrices offering a high level of performance and thereby for example enable a more efficient use of transmit power by a gNB or other transmitter device for multi-antenna transmission. The precoding matrices may also enable an improved SINR (signal-to-interference-and-noise ratio) (SINR) at the UE or other receiver device. Further, the precoding matrices may also enable an improved throughput and/or a higher capacity in the wireless communication network.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of transmitter devices and receiver devices. Further, the concepts may be applied with respect to various numbers of antennas in the transmitter device, e.g., two or more, various numbers of antennas in the receiver device(s), e.g., two or more, and various numbers of receiver devices. Further, it is noted that the concepts could also be applied to multiple receiver devices by performing the above-described dimensionality reduction individually for each part of the channel matrix that corresponds to a certain receiver device, e.g., for the part defined by a certain value of the index $p$ in the matrix as given in (1). The concepts may also be applied in connection with various types of precoding algorithms, without limitation to the above-mentioned examples of an MMSE based algorithm or a ZF based algorithm. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling multi-antenna transmission, the method comprising:
   determining a channel matrix representing characteristics of a multi-path channel between a transmitter device equipped with multiple transmitter antennas and a receiver device equipped with multiple receiver antennas, the channel matrix being organized in a first number of channel vectors, each associated with a different one of the multiple receiver antennas;
   combining the channel vectors to a smaller second number of linear combinations of the channel vectors;
   composing a reduced channel matrix from the linear combinations of the channel vectors;
   determining a precoding matrix based on the reduced channel matrix; and
   controlling multi-antenna transmission by the transmitter device based on the determined precoding matrix;
   wherein said combining of the channel vectors and composing of the reduced channel matrix comprises:
      determining a Gram matrix of the channel matrix;
      determining eigenvectors and associated eigenvalues of the Gram matrix;
      selecting the eigenvectors associated with the largest eigenvalues; and
      transforming the channel matrix based on the selected eigenvectors.

2. The method according to claim 1, wherein a number of the selected eigenvectors corresponds to the second number.

3. The method according to claim 1, further comprising:
   composing a transformation matrix from the selected eigenvectors;
   by applying the transformation matrix to the channel matrix, transforming the channel matrix to the reduced channel matrix.

4. The method according to claim 1, further comprising:
   determining the channel matrix for each of multiple different frequencies;
   determining the Gram matrix by averaging over states of the channel matrix as determined for each of the multiple different frequencies.

5. The method according to claim 4, wherein the multi-antenna transmission is based on modulation of symbols onto multiple subcarriers and the multiple frequencies comprise at least some of the subcarriers.

6. The method according to claim 1, wherein said determining of the precoding matrix is based on a minimum mean square error based algorithm or on a zero-forcing based algorithm.

7. The method according to claim 1, comprising:
   determining the channel matrix based on measurements on reference signals transmitted from the receiver device to the transmitter device.

8. The method according to claim 1, comprising:
   determining the channel matrix based on measurements on reference signals transmitted from the transmitter device to the receiver device.

9. The method according to claim 1, wherein the transmitter device is an access node of a wireless communication network.

10. The method according to claim 1, wherein the receiver device is a wireless communication device connected to a wireless communication network.

11. A device, the device, comprising
   at least one processor, and
   a memory storing program code, which when executed by the at least one processor, causes the device to:
      determine a channel matrix representing characteristics of a multi-path channel between a transmitter device equipped with multiple transmitter antennas and a receiver device equipped with multiple receiver antennas, the channel matrix being organized in a first number of channel vectors, each associated with a different one of the multiple receiver antennas;
      combine the channel vectors to a smaller second number of linear combinations of the channel vectors;
      compose a reduced channel matrix from the linear combinations of the channel vectors;
      determine a precoding matrix based on the reduced channel matrix; and
      control multi-antenna transmission by the transmitter device based on the determined precoding matrix;
      wherein combining the channel vectors and composing the reduced channel matrix comprises:
         determining a Gram matrix of the channel matrix;
         determining eigenvectors and associated eigenvalues of the Gram matrix;
         selecting the eigenvectors associated with the largest eigenvalues; and
         transforming the channel matrix based on the selected eigenvectors.

12. The device according to claim 11, wherein a number of the selected eigenvectors corresponds to the second number.

13. The device according to claim 11, wherein the device is further configured to combine the channel vectors and compose the reduced channel matrix by:
   composing a transformation matrix from the selected eigenvectors;
   by applying the transformation matrix to the channel matrix, transforming the channel matrix to the reduced channel matrix.

14. The device according to claim 11, wherein the device is further configured to:
   determine the channel matrix for each of multiple different frequencies;
   determine the Gram matrix by averaging over states of the channel matrix as determined for each of the multiple different frequencies.

15. The device according to claim 14, wherein the multi-antenna transmission is based on modulation of symbols onto multiple subcarriers and the multiple frequencies comprise at least some of the subcarriers.

16. The device according to claim 11, wherein the device is configured to determine the precoding matrix is based on a minimum mean square error based algorithm or on a zero-forcing based algorithm.

17. The device according to claim 11, wherein the device is configured to determine the channel matrix based on measurements on reference signals transmitted from the receiver device to the transmitter device.

18. The device according to claim 11, wherein the device is configured to determine the channel matrix based on measurements on reference signals transmitted from the transmitter device to the receiver device.

19. The device according to claim 11, wherein the transmitter device is an access node of a wireless communication network.

20. The device according to claim 11, wherein the receiver device is a wireless communication device connected to a wireless communication network.

* * * * *